US00RE34415E

United States Patent [19]

Traver

[11] E Patent Number: Re. 34,415

[45] Reissued Date of Patent: Oct. 19, 1993

[54] METHOD FOR PREPARING CARBOXY FUNCTIONAL SILICONES

[75] Inventor: Frank J. Traver, Troy, N.Y.

[73] Assignee: General Electric Company, Waterford, N.Y.

[21] Appl. No.: 750,845

[22] Filed: Aug. 26, 1991

Related U.S. Patent Documents

Reissue of:

[64] Patent No.: 4,990,643
Issued: Feb. 5, 1991
Appl. No.: 542,272
Filed: Jun. 22, 1990

[51] Int. Cl.[5] ..... C07F 7/08
[52] U.S. Cl. ..... 556/439
[58] Field of Search ..... 556/439

[56] References Cited

U.S. PATENT DOCUMENTS

| | | | |
|---|---|---|---|
| 3,065,502 | 11/1962 | Bluestein | 556/439 X |
| 3,112,333 | 11/1963 | Bailey | 556/439 |
| 3,182,076 | 5/1965 | Holdstocle | 556/439 |
| 3,629,309 | 12/1971 | Bailey et al. | 556/439 X |
| 3,729,444 | 4/1973 | Bey et al. | 556/439 X |
| 4,378,459 | 3/1983 | Hardrian et al. | 556/439 |
| 4,587,320 | 5/1986 | Swihart | 556/439 X |
| 4,912,241 | 3/1990 | Coles et al. | 556/438 |

*Primary Examiner*—Paul F. Shaver

[57] ABSTRACT

A novel method is provided for preparing carboxy functional silicones, comprising the steps of:

(1) addition reacting a mixture of ingredients containing
  (A) an olefin-terminated organoacyloxysilane;
  (B) an organohydrogenpolysiloxane, and
  (C) a precious metal or a precious metal-containing catalyst, and
(2) hydrolyzing the addition reaction product prepared in step (1).

8 Claims, No Drawings

METHOD FOR PREPARING CARBOXY FUNCTIONAL SILICONES

Matter enclosed in heavy brackets [ ] appears in the original patent but forms no part of this reissue specification; matter printed in italics indicates the additions made by reissue.

BACKGROUND OF THE INVENTION

This invention relates to a method for preparing carboxy functional silicones. More particularly, this invention relates to a method for preparing carboxy functional silicones from silane derivatives of alpha-olefin terminated-organic acids.

Carboxy functional silicones are useful in many applications where water- and alcohol-soluble organopolysiloxanes are desirable. For example, they are useful as emulsifying agents for the formation of aqueous emulsions of conventional organopolysiloxane fluids and in applications such as alcohol base cosmetics. Carboxy functional silicones can also function as reactants in the preparation of polysiloxane-polyether copolymer surfactants which are useful as additiives in polyurethane foam.

Carboxy-functional silicones and methods for preparing them are known in the art. Reference is made, for example, to U.S. Pat. Nos. 3,182,076 and 3,629,165, both to Holdstock. In the Holdstock method, carboxy-functional silicones are prepared by the hydrolysis and condensation of a mixture containing organotrichlorosilane, a diorganodichlorosilane, and a cyanoalkyldiorganochlorosilane. During the hydrolysis and condensation of these reactants, the various silicon-bonded chlorine atoms are replaced by silicon-bonded hydroxyl groups which intercondense to form siloxane linkages. The nitrile radical hydrolyzes to a carboxyl radical. Hydrochloric acid is also formed in the hydrolysis reaction.

One drawback to the prior art method described above is that cyano silanes are quite expensive and require the use of acrylonitrile, which is undesirable. In addition, the highly acidic media, i.e., concentrated hydrochloric acid required to perform the hydrolysis in the Holdstock method, is extremely corrosive and causes equipment problems.

It would be desirable, therefore, to provide a method for preparing carboxy functional silicones which does not require the use of either cyano silanes or acidic catalysts.

SUMMARY OF THE INVENTION

The present invention provides a novel method for preparing carboxy functional silicones, comprising the steps of:

(1) addition reacting a mixture of ingredients comprising:

(A) an olefin-terminated organoacyloxysilane having the general formula:

$$=(I)R_3SiOOC(R^1)_xCH{=}CH_2$$

wherein R [and $R^1$ are] *is a* monovalent hydrocarbon [radicals] *radical* free of aliphatic unsaturation, $R^1$ *is a divalent hydrocarbon free of aliphatic unsaturation* and x is a number in the range from about 0 to about 30;

(B) an organohydrogenpolysiloxane having a hydride concentration of 0.01 to about 100 mole percent and a viscosity of about 2 to about 1 million centipoise at 25° C.; and (C) an amount of a precious metal or a precious metal-containing catalyst effective for promoting an addition reaction between components (1) and (2); wherein components are present in a molar ratio of about 1:1; and (2) hydrolyzing the addition reaction product formed in step (1).

DETAILED DESCRIPTION OF THE INVENTION

The present invention is directed to a novel method of preparing carboxy functional silicones by (1) addition reacting a mixture of ingredients containing (A) an olefin-terminated organoacyloxysilane, (B) an organohydrogenpolysiloxane, and (C) a precious metal or a precious metal-containing catalyst, and (2) hydrolyzing the reaction product formed in step (1).

In step (1) of the method of this invention, the addition reaction between components (A) and (B) in the presence of the catalyst (component (C)) is carried out by thoroughly mixing the reactants and maintaining the mixture at the reaction temperature for a time sufficient to effect the reaction. The reaction can be room temperature or even as low as about 0° C. The upper limit to the reaction temperature will depend on the particular reactants and the particular diluent used for the catalyst. In general, reaction temperatures on the order of 70° to 100° C., preferably from about 100° to 130° C., can be used in this invention. The time required for effecting the addition reaction depends upon a number of factors such as the particular reactants and the amount of catalyst used. Typically, reaction times can run from a few minutes up to 12 or more hours depending on reaction conditions.

In step (2) of the method of this invention, the addition reaction product formed in step (1) above is then hydrolyzed in the presence of water to form the final product, i.e., the carboxy functional silicone. The amount of water necessary is at least one mole of water per mole of component A. The maximum amount of water used is not critical, although extremely large excesses of water are impractical. Generally, from about 1 to about 10, and preferably from about 1 to about 3 moles of water per mole of component A, should be used in step (2).

The mixture of the reaction product of step (1) and water is agitated until hydrolysis is complete. The temperature for the hydrolysis reaction ranges from about 50° to about 100° C. and preferably from about 70° to about 90° C. The time for completion will depend on the reaction system and specifically the temperature. Typically, about 1 to about 4 hours is required for completion of the hydrolysis.

Preferably, the reaction product is then removed from any water which is present after the hydrolysis reaction is completed.

The olefin-terminated acyloxysilane useful as component (A) in step 1 of the method of this invention has the general formula:

$$(I)[R_3SiO(R^1)_xCH{=}CH_2]$$
$$R_3SiOOC(R^1)_xCH{=}CH_2$$

wherein R [and $R^1$ are ] *is a* monovalent hydrocarbon [radicals] *radical* free of aliphatic unsaturation, $R^1$ *is a*

*divalent hydrocarbon free of aliphatic unsaturation* and "x" is a number from about 0 to about 30.

Radicals represented by R [and $R^1$] in formula (I) include, for example, alkyl radicals, e.g. methyl, ethyl, propyl, butyl, octyl, and the like; aryl radicals, e.g., phenyl, tolyl, xylyl, and the like; cycloalkyl radicals, e.g., cyclohexyl, cycloheptyl, and the like; aralkyl radicals, e.g., benzyl, phenylethyl, and the like. Preferably, all of the radicals represented by R [and $R^1$] are selected from the class consisting of methyl and phenyl radicals and, most preferably, all of the radicals represented by R [and $R^1$] are methyl.

*Radicals represented by $R^1$ in formula (I) include, for example, alkylene radicals, e.g., methylene, ethylene, propylene, butylene, octylene, and the like, arylene radicals, e.g., phenylene, tolylene, xylylene, and the like; cycloalkylene radicals, e.g., cyclohexylene, cycloheptylene, and the like; aralkylene radicals, e.g., benzylene, phenylethylene, and the like. Preferably, all of the radicals represented by $R^1$ are selected from the class consisting of methylene and phenylene radicals and, most preferably, all of the radicals represented by $R^1$ are methylene.*

In formula (I), x is preferably a number in the range of about 0 to about 15, and most preferably about 1 to about 8.

Component (A) can be prepared by reacting as elevated temperature the corresponding carboxylic acid with an alkali metal hydroxide in the presence of an organic solvent to form an alkali metal salt of the organic acid, and then reacting at elevated temperature the alkali metal salt with a triorganochlorosilane to form the organosilane represented by formula (I) above.

Component (B) in step (1) of the present method is an organohydrogenpolysiloxane. The organohydrogensiloxane component is generally a relatively simple molecular structure and sometimes is a mixture of such materials. One characteristic of the organohydrogenpolysiloxane is that it contains at least an average of two silicon-bonded hydrogen atoms per molecule. The organohydrogenpolysiloxane has a hydride concentration of 0.01 to about 100 mole percent and a viscosity of about 2 to about 1,000,000 centipoise at 25° C.

Organohydrogenpolysiloxanes which are useful in hydrosilation or addition reactions are well known in the skilled artisan. Reference is made, for example, to U.S. Pat. Nos. 3,436,366; 3,425,967; and 4,808,634; each of which are hereby incorporated by reference into the instant disclosure.

The organohydrogenpolysiloxane may have the general formula:

$(R^2)_a(H)_bSiO_{(4-a-b)}/2$ wherein $R^2$ is a monovalent hydrocarbon radical free of aliphatic unsaturation, and "a" has a value of from about 0 to about 3, "b" has a value of from about 0 to about 3, and the sum of "a" plus "b" is from about 1 to about 3.

Radicals represented by $R^2$ in formula (I) include, for example, alkyl radicals, e.g., methyl, ethyl, propyl, butyl, octyl, and the like; aryl radicals, e.g., phenyl, tolyl, xylyl, and the like; cycloalkyl radicals, e.g., cyclohexyl, cycloheptyl, and the like; aralkyl radicals, e.g., benzyl, phenylethyl, and the like. Preferably, all of the radicals represented by $R^2$ are selected from the class consisting of methyl and phenyl radicals and, most preferably, all of the radicals represented by $R^2$ are methyl.

Components A and B are used in the composition of this invention in a molar ratio of about 1:1.

Component (C) in step (1) is a precious metal or precious metal-containing catalyst. The precious metal catalyst component includes within its scope all of the well known platinum and rhodium catalysts as well as other less known noble metal hydrosilation catalysts.

Especially preferred platinum or platinum-containing catalysts include the platinum-hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 3,814,730 to Karstedt. Additionally, the platinum chloride-olefin complexes described in U.S. Pat. No. 3,516,946 to Modic are also useful herein. All of the aforesaid patents are incorporated by reference into the present disclosure for their teaching relating to hydrosilation catalysts.

The preferred catalyst is that disclosed in Lamoreaux, U.S. Pat. No. 3,220,970, wherein the platinum-containing material is a complex formed from chloroplatinic acid with up to 2 moles per gram of platinum of a member selected from the class consisting of alcohols, ethers, aldehydes, and mixtures of the above. The catalyst described in Lamoreaux will sometimes be referred to herein as the Lamoreaux catalyst.

The catalyst is used in an amount sufficient to promote an addition reaction between components (A) and (B). Typically, this amount is within the range of from about 1 to about 100, preferably from about 1 to about 80, and most preferably from about 1 to about 20, parts per million (ppm) of the total compositions of (A), (B), and (C).

Because the catalyst is employed in such minute quantities it is often desirable to use the catalyst as a solution in a diluent to facilitate uniform dispersion of the catalyst in the reactants. Suitable diluents are any material which is a solvent for the catalyst and which is inert to the reactants under the conditions of the reaction. The preferred diluents are hydrocarbon solvents such as aromatic hydrocarbons, including benzene, toluene and xylene. However, aliphatic solvents such as aliphatic mineral spirits can also be employed. In addition to these carbon solvents the diluent can be an ester such as ethylacetate. Where a diluent is employed, the diluent is employed in an amount equal to from 10 to 10,000 parts by weight diluent per part of the catalyst compound of the present invention.

The carboxy functional silicone formed by the method of this invention comprises terminal groups of the general formula:

$$HOOC(R^1)_xCH_2CH_2R_c^2SiO_{(3-c)/2}-$$

repeating units of the formula:

$$(R^2)_2SiO-$$

wherein $R^1$, $R^2$, and "x" are as previously described, and "c" is a number from about 0 to about 2.

The following example is illustrative of the practice of this invention and is not intended for purposes of limitation.

EXAMPLE

To a three liter round bottom three neck flask equipped with condensor, thermometer, heating mantle, agitator, thermal controller and water trap there was added 184 grams of 10-Hendecenoic acid and 1000 grams toluene. Then 40 grams of NaOH was added and the solution refluxed to drive off water produced during the formation of the Na soap. The solution became quite thick during the soap formation and about 20 cc of water was collected. Once the soap was completely formed and the carboxy peak became absent on the IR scan, 115 grams of trimethylchlorosilane were added and the solution refluxed. The solution became quite fluid, but was turbid due to the formation of salt, IR scan indicated the formation of $(CH_3)_3Si\text{-}OOC(CH_2)_8CH{=}CH_2$(peak at about 1725 cm(−1).

Next was added 625 grams of a methyl hydrogen containing fluid having the formula:

$$[(CH_3)_3SiOSi(CH_3(H)O_3SI(CH_3)_2O_{20}Si(CH_3)_3]$$
$$(CH_3)_3SiO(Si(CH_3)(H)O)_3(SI(CH_3)_2O)_{20}Si(CH_3)_3$$

The fluid had a viscosity of 814 centistokes at 25° C. and a solids content 95+%. This fluid was added in the presence of the Lamoreaux catalyst. The reaction yielded an exotherm and was carried out at 110°-120° C., which is the reflux temperature of toluene. The IR scan showed the disappearance of the SiH band.

After the addition was complete, water was added and the solution heated at reflux for several hours. The IR scan showed the disappearance of the trimethylsilyl end-groups in the carboxy fluid at about 1725 cm(−1) and the appearance of the —COOH peak at 1713 cm(−1).

What is claimed is:

1. A method of preparing carboxy functional silicones, comprising the steps of:

(1) addition reacting a mixture of ingredients comprising:

(A) an organoacyloxysilane having the general formula:

$$\text{(I)}\ R_3SiOOC(R^1)_xCH{=}CH_2$$

wherein R [and $R^1$are] *is a* monovalent hydrocarbon [radicals] *radical* free of aliphatic unsaturation, $R^1$ *is a divalent hydrocarbon free of aliphatic unsaturation* and "x" is a number from about 0 to about 30.

(B) an organohydrogenpolysiloxane having a hydride concentration of 0.01 to about 100 mole percent and a viscosity of about 2 to about 1 million centipoise at 25° C.; and (C) an amount of a precious metal or a precious metal-containing catalyst effective for promoting an addition reaction between components (1) and (2);

wherein components are present in a molar ratio of about 1:1; and (2) hydrolyzing the addition reaction product formed in step (1).

2. A method according to claim 1 wherein R [and $R^1$ are each] *is* methyl or phenyl, $R^1$ *is methylene or phenylene* and x is a number from about 0 to about 15.

3. A method according to claim 2 wherein R [and $R^1$ are] is methyl, $R^1$ is methylene and x is a number from about 1 to about 8.

4. A method according to claim 1 wherein the catalyst is a platinum or platinum-containing catalyst.

5. A method according to claim 1 wherein component (C) is present in an amount within the range of from about 1 to about 100 parts per million of the total composition of components A and B.

6. A method according to claim 5 wherein component (C) is present in an amount within the range of from about 1 to about 80.

7. A method according to claim 6 wherein component (C) is present in an amount within the range of from about 1 to about 20.

8. A method according to claim 1 wherein in step (B), the amount of water is in the range of from about 1 to about 10 moles of water per mole of component (A).

* * * * *